United States Patent

[11] 3,621,015

| [72] | Inventors | Werner Haede<br>Hofheim, Taunus;<br>Werner Fritsch, Neuenhain, Taunus; Kurt Radscheit, Kelkheim, Taunus; Ulrich Stache, Hofheim, Taunus, all of Germany |
|---|---|---|
| [21] | Appl. No. | 796,164 |
| [22] | Filed | Feb. 3, 1969 |
| [45] | Patented | Nov. 16, 1971 |
| [73] | Assignee | Farbwerke Hoechst Aktiengesellschaft vormals Meister Lucius & Bruning Frankfurt am Main, Germany |
| [32] | Priority | Feb. 23, 1968 |
| [33] | | Germany |
| [31] | | P 16 68 099.2 |

[54] PROCESS FOR THE MANUFACTURE OF (ANDROST-17β-Y1)-α-PYRONES
9 Claims, No Drawings

[52] U.S. Cl..................................................260/239.57,
260/397.1, 260/397.4, 260/239.55
[51] Int. Cl.........................................................C07c 169/64
[50] Field of Search............................................/Machine
Searched Steroids

[56] References Cited
UNITED STATES PATENTS
2,398,861  4/1946  Ruzicka..........................  260/239.5

*Primary Examiner*—Elbert L. Roberts
*Attorney*—Curtis, Morris & Safford

ABSTRACT: The method of making androst-(17β-αy1)-α-pyrones having inotropic, cardiovascular, and diuretic activity by Wittig reaction of a 20-keto-21-acetal pregnene with a methyl-triphenyl-phosphonium halide to form the corresponding 20-methylene compound, hydrolysis of the 21-acetal group, Michael addition of a malonic acid ester to the 20-methylene unsaturation, hydrolysis of the di-ester formed to the free di-acid, decarboxylation of one carboxy group, cyclization to a 17-enol-α-lactone with a carboxylic acid anhydride, and dehydrogenation to the corresponding α-pyrone; 3-β-hydroxy-21-oxo-23-carbomethoxy-$\Delta^5$-cholenic acid; 3β-hydroxy-21-oxo-23-carboxy-$\Delta^5$-cholenic acid; and 3β-hydroxy-21-oxo-$\Delta^5$-cholenic acid, obtained as intermediates in such a method.

PROCESS FOR THE MANUFACTURE OF (ANDROST-17β-Y1)-α-PYRONES

It is known that (androst-17β-yl)-α-pyrones can be prepared by the reaction of 21-dialkoxy-20-keto-steroid derivatives with hydroxymethyl triphenyl phosphonium halides or trimethyl sulfonium of -sulfoxonium halides and subsequent cyclization (cf. Belgian Pat. No. 716,968).

The present invention relates to (androst-17β-yl)-α-pyrones corresponding to the general formula I

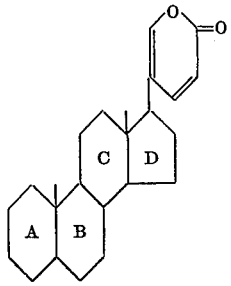

I in which the nuclei A, B, C and D may be linked to each other in cis- or transposition and in which double linkages in 4-, 5- or 14- position, furthermore free or esterified hydroxyl groups in 3-, 4-, 6-, 11-, 12-, 14-, 15- or 19-position or keto groups in 3-, 6- or 15-position may be present, and to a new process for their manufacture.

The process according to the invention comprises reacting a steroid 21-acetal of the general formula II,

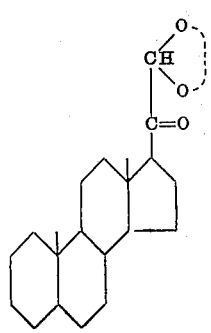

II wherein the group

represents an open or cyclic acetal group and wherein hydroxy groups present may be protected by etherification and/or keto groups present may be converted into enol ethers, enamines, ketals or thioketals, with a methyl-triphenylphosphonium halide; subjecting the product obtained to acid hydrolysis to form an aldehyde of the general formula III;

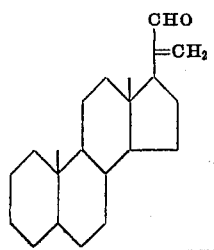

III reacting this aldehyde with a malonic ester in the presence of a basic compound; hydrolyzing the dicarboxylic acid ester thus obtained of the formula IV

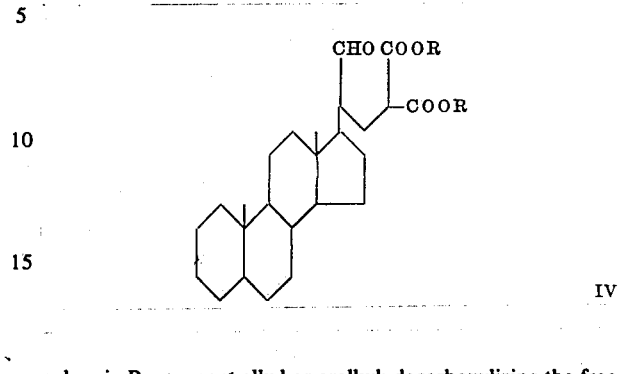

IV wherein R represent alkyl or aralkyl; decarboxylizing the free dicarboxylic acid to form a monocarboxylic acid; heating this with a carboxylic acid anhydride; and subjecting the enol-α-lactone of the general formula V

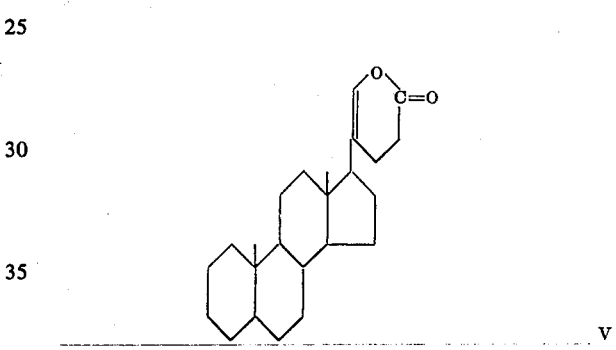

V thus obtained to dehydrogenation.

The process of the present invention is illustrated below with reference to a saturated 3-hydroxy steroid. The starting material is the corresponding 3-tetrahydropyranyl ether-21-dimethyl acetal. The Michael addition is effected with malonic acid dimethyl ester and lactone formation employs acetic acid anhydride.

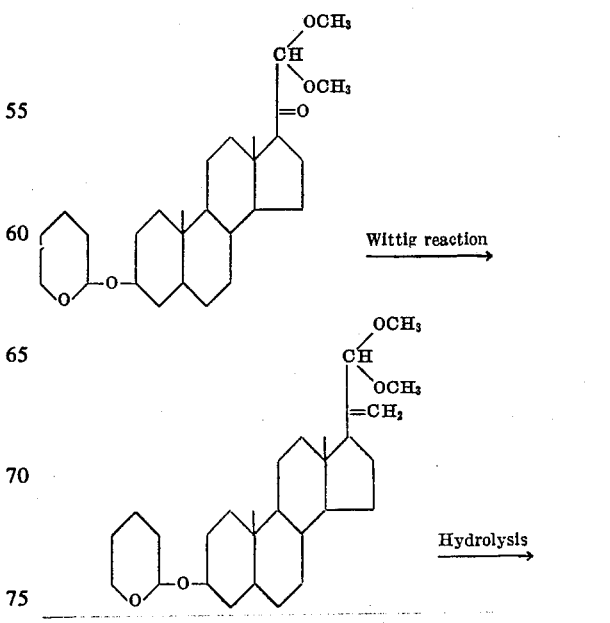

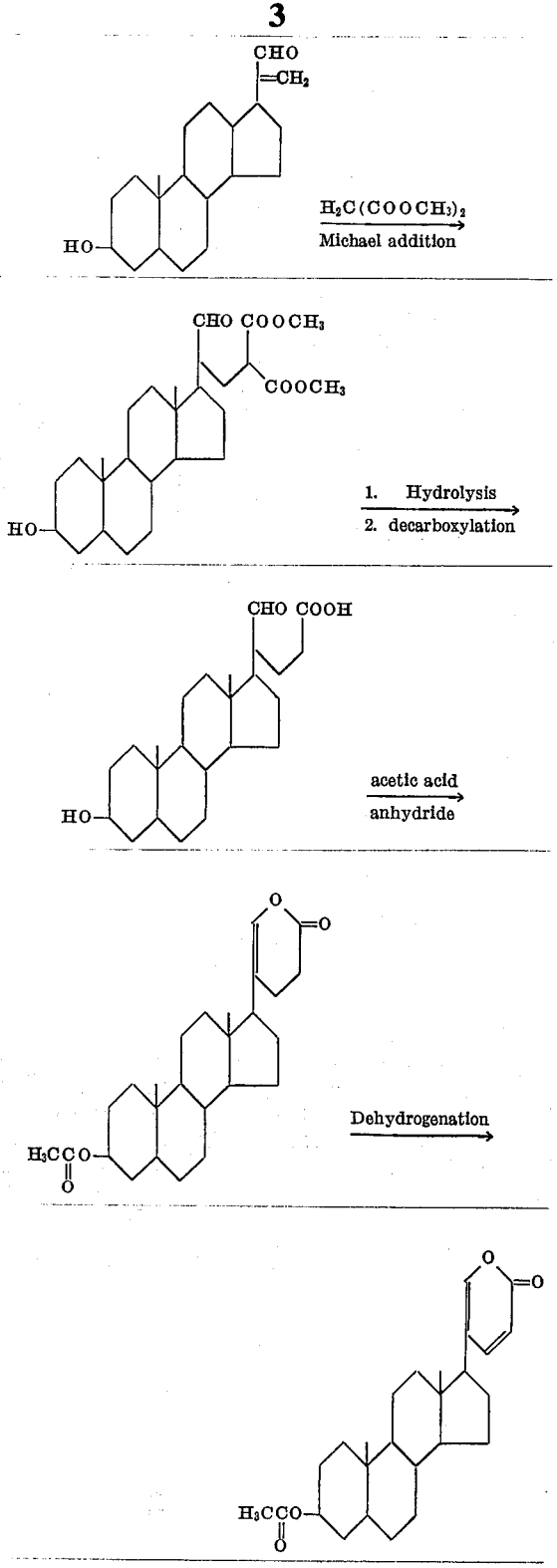

As starting substances there may be used, for instance, the 21-acetals of the following steroids: 3-hydroxy-Δ⁵- or 3-hydroxy-Δ⁴-pregnen-20-on-21-als; 3,15-dihydroxy-Δ⁵- or 3,15-dihydroxy-Δ⁴-pregnen-20-on-21-als and 3-hydroxy-Δ⁵- or 3-hydroxy-Δ⁴-pregnen-15,20-dion-21-al-15-ketals of the 3α-, 3β-, 14α- and 14βseries; 3-hydroxy-Δ⁴,¹⁴- or Δ⁵,¹⁴-pregnadien-20-on-21-als of the 3α- and 3β-series; 3-hydroxy-pregnan-20-on-21-als, 3,15-dihydroxy-pregnan-20-on-21-als and 3-hydroxy-pregnan-15,20-dion-21-al-15-ketals of the 3α-, 3β-, 5α, 5β-, 14α- and 14β-series as well as 3-hydroxy-Δ¹⁴-pregnen-20-on-21-als of the 3α-, 3β-, 5αand 5β-series.

Furthermore, there can be used, for example, the 21-acetals of the 3-ketals, -thioketals, -enamines -enolethers and -enolesters of the following steroids: 3-keto-Δ⁴-pregnen-20-on-21-als, 3-keto Δ⁴-pregnen-15,20-dion-21-al-15-ketals, 3-keto-Δ⁴-pregnen-15-hydroxy-20-on-21-als of the 14α- and 14β-series and 3-keto-Δ¹⁴-pregnen-20-on-21-als of the 5α- and 5β-series, 3-keto-Δ⁴,¹⁴-pregnadien-20-on-21-als, as well as 3-keto-pregnan-20-on-21-als, 3-keto-15,20-dion-21-al-15-ketals and 3-keto-15-hydroxy-pregnan-20-on-21-als of the 5α-, 5β-, 14α- and 14β-series.

Furthermore, steroid compounds etherified at the hydroxyl groups may be used. Radicals used in the etherification of the hydroxy groups are for instance alkyl or cycloalkyl groups such as, for instance, methyl, ethyl, or cyclohexyl, or araliphatic groups such as benzyl or triphenyl-methyl, or tetrahydropyranyl. It is recommended to etherify reactive hydroxy groups previously to the main reaction whereas less reactive hydroxy groups, for instance those in 11β- or 14β-, position may remain free.

In particular the following steroids, the OH-groups of which may be protected in the above-mentioned way, are used as starting substances: 5α-pregnan-3β-ol-20-one, 5β-pregran-3β-ol-20-one, pregn-5-en-3β-ol-20-one, 5β-pregn-14-en-3Xβ-ol-20-one, 5β-pregn-14-en-3α-ol-20-one, pregna-5,14-dien-3β-ol-20-one.

As starting steroids with additional keto groups there may be used: 5β-pregnane-3,20-dione, 5β-pregn-14-ene-3,20-dione, pregna-4,14-diene-3,20-dione, pregn-4-ene-15-ol-3,20-dione, 5β-pregnan-15-ol-3,20-dione, 5β-pregnane-3β, 15-diol-20-one, 5β-pregnan-3β-ol-15,20-dione. In these steroids the keto groups in 3- or 15-position have to be protected as mentioned above.

The reaction of the 21-dialkoxy-20-ketosteroids with methyl-triphenyl-phosphonium halides according to Wittig is performed, for instance, by means of bases such as alkali metal alkyls, alkaline earth metal alkyls, alkali metal aryls or alkaline earth metal aryls, for instance phenyllithium or butyl-lithium, furthermore by means of alkali metal alcoholates and alkaline earth metal alcoholates as well as hydrides, for instance sodium methylate, potassium methylate, sodium ethylate, potassium ethylate, sodium tert.-butylate, potassium tert.-butylate, sodium hydride, potassium hydride or strongly basic salts containing the dimethylsulfinyl anion and the like.

The reaction is performed in an inert organic solvent, e.g. ethers such as, for instance, diethylether, tetrahydrofurane, dioxane, glycoldimethyl-ether, diethyleneglycol-dimethylether; furthermore dimethylsulfoxide, dimethylformamide; aromatic or aliphatic hydrocarbons, for instance, benzene, toluene, hexane; methylenechloride or alcohols such as methanol, ethanol, tert.butanol or mixtures of said solvents.

For carrying out the process the steroid reagents are dissolved or suspended in one of the above-mentioned solvents and added to a solution or suspension containing one of the above-mentioned bases as well as one of the above-mentioned phosphonium salts or the ylide formed by the two components. It is likewise possible to proceed vice versa and to start with the solution or suspension of the steroids or, alternatively, to add two of the reaction components to the third one. It is of advantage to use the base as well as the phosphonium salt in an excess amount, of for instance, about 1 to 10 mol equivalents, preferably 1 to 5 mol equivalents. The molar ratio of base to phosphonium salt advantageously is about 1:1.1. The reaction is performed at temperatures between −50° C. and the boiling temperature of the solvents used, preferably at a temperature between 0° C. and the boiling temperature of the solvent used. The reaction periods may vary between 1 minute and about 48 hours; in general, the reaction is terminated after a period between 30 minutes and 12 hours.

The acid hydrolysis of the product of the Wittig reaction to form (III), in the course of which protective groups may be split off, is preferably carried out in the presence of mineral acids or strong organic acids such as p-toluenesulfonic acid, methanesulfonic acid, or oxalic acid, in water-miscible organic solvents, for instance, lower alcohols such as methanol, ethanol, ort-butanol ketones such as acetone; as ethers such as tetrahydrofurane, dioxane or glycoldimethylether; lower carboxylic boxylic acids, instance formic acid, acetic acid or propionic acid; and other strongly polar solvents such as dimethylsulfoxide or dimethylformamide. The hydrolysis can be methanesulfonic acid or oxalic acid. The hydrolysis can be carried out at temperatures between 0° C. and the boiling temperature of the solvents. The reaction time is between a few minutes and several days, depending upon the temperature and the concentration of the catalyzing acid.

The Michael addition of the unsaturated aldehyde (III) with a malonic acid ester may take place in an inert solvent, e.g., a lower aliphatic alcohol such as methanol, ethanol or t-butanol. Furthermore, benzene, cyclohexane, hexane, or mixtures thereof with the above-mentioned alcohols, polar solvents such as dimethyl formamide or dimethyl sulfoxide, or pyridine may also be used. As catalysts, basic compounds such as alkali metal alcoholates and alkaline earth metal alcoholates, KOH, NaOH, NaNH$_{NaOH}$. or KNH$_2$ as well as strong organic bases such as piperidine or triethanolamine are suitable. The reaction can be carried out at temperatures between −10° C. and the boiling temperature, preferably between 0° C. and room temperature. The reaction periods are in a range of from a few seconds to several hours. After neutralization the reaction mixture is worked up by precipitating the Michael addition product of the general formula IV by means of water, or, if solvents immiscible with water are used, by separating the solvent phase after addition of water and by evaporating the solvents to dryness.

The Michael addition product (IV) can be hydrolyzed after purification (for instance after crystallization) or as a crude product by boiling it with an alkali such as sodium hydroxide, potassium hydroxide, sodium carbonate, potassium carbonate, sodium bicarbonate, or potassium bicarbonate, in a solvent containing water, for instance lower aliphatic alcohols such as methanol, ethanol or t-butanol, or water-soluble ethers, for instance tetrahydrofurane, dioxane, glycol dimethyl ether or glycol monomethyl ether. The reaction solution is then acidified, the dicarboxylic acid formed is precipitated with water and, after drying, subjected to decarboxylation. To this end, the dicarboxylic acid is heated in the absence of solvents for a short period to a temperature between 130° C. and 180° C. or, in pyridine and other weakly basic solvents, to a temperature of about 100° C.

For cyclization to the enol-δ-lactone (V), the monocarboxylic acid is heated with a carboxylic acid anhydride, preferably in the presence of alkali metal salts or alkaline earth metal salts of carboxylic acids. As such aliphatic carboxylic acid anhydrides, for instance acetic acid anhydride or propionic acid anhydride, or aromatic carboxylic acid anhydrides, such as benzoic acid anhydride, are preferably used. The substance is worked up by distilling off the carboxylic acid anhydride in vacuo, purifying the residue by chromatography, and crystallizing the enol-lactone; for chromatography silica gel is especially suitable.

Analogous cyclizations with δ-keto acids have been described in the literature (J.Am. Chem. Soc. 74,4245 (1952)). As described in example 1f, the application of said known method to δ-aldehyde acids, however, gives yields of only about 20 percent. These yields can be increased to 70 percent and more, if the acetic acid anhydride is distilled off after the reaction and the residue is heated to temperatures above 200° C., advantageously 230°–240° C. according to the invention. When proceeding is said way, it is of advantage to heat the reaction mixture together with solid substances such as sea sand, quartz powder and the like and to operate under reduced pressure, preferably at 10–200 mm. Hg.

For dehydrogenation to the α-pyrone of the general formula I, the usual dehydrogenating agents may be used, for instance, quinones, selenium dioxide or palladium.

The process according to the invention is surprising because it could not be foreseen that the reaction between the aldehyde (III) with malonic ester would take place in the sense of a Michael addition; a condensation according to Knoevenagel with formation of

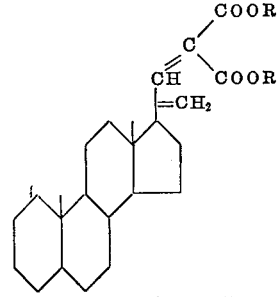

would have been likely to occur.

Furthermore, it was surprising that the aldehyde-dicarboxylic acid ester (IV) could easily be hydrolyzed and obtained in a very good yield without affecting the aldehyde group. Because of the presence of reactive hydrogen atoms in 20- and 23-position of the steroid molecule, intra- or intermolecular condensations and disproportionation according to Cannizaro could have been expected.

Finally, it was surprising that dehydrogenation could be carried out with formation of (androst-17β-yl)-α-pyrones without' isomerization of the steroid structure. According to J.Am.' Chem. Soc. 75, page 3162 (1153) such an isomerization takes place: in the course of the dehydration of oestronemethyl ether by means of palladium, isoequilenine methyl ether is formed.

The products obtained according to the process of the present invention possess valuable pharmacological properties. In addition to inotropic and cardiovascular action, they also show diuretic activity. They are therefore useful as orally administrable medicaments against cardiac and renal diseases in mammals. They can also be used as intermediate products in the production of medicaments.

The following examples serve to illustrate the invention but they are not intended to limit it thereto.

EXAMPLE 1 a. 3β-hydroxy-20,21-dioxo-Δ⁵-pregnene-21-dimethylacetal, 3-tetrahydropyronyl ether 40 Grams of 21,21-dimethoxy-Δ⁵-pregnene-3β-ol-20-one, 20 cc. of dihydropyrane and 0.4 cc. of phosphorus oxychloride are stirred for 3 hours at room temperature in 200 cc. of tetrahydrofurane under an atmosphere of N$_2$; the reaction solution is then poured into ice water containing sodium carbonate. Tetrahydrofurane and excessive dihydropyrane are removed in a rotating evaporator under reduced pressure. The water is poured off, the residue is crystallized by scratching with methanol and the tetrahydropyranyl ether is recrystallized. Melting point 75–85° C.

b. 3β-hydroxy-20-methylene-21-oxo-Δ⁵-pregnene

Under an atmosphere of N$_2$, 6.6 grams of sodium hydride are introduced into 100 cc. of dimethylsulfoxide and, with stirring, slowly heated to 75° C. This temperature is maintained for 45 minutes. At about 5° C. a solution of 94 grams of triphenylmethyl phosphonium bromide is then added. The temperature is maintained at 10° C. for a further 10 minutes. 40 grams of tetrahydropyranylether are added, the mixture is heated to 70° C. and stirred at this temperature for 24 hours. After cooling, the reaction mixture is poured into 2 liters of ice water. The precipitate becomes solid and can be filtered off. The crude product is chromatographed on a column containing 1 kg. of Al$_2$O$_3$ (basic, activity level 2). The first portions contain impurities and are discarded. From the following fractions using benzene/hexane (1:1) as solvent, about 30 grams of the tetrahydropyranyl ether of the 20-methylene compound are recovered. These 30 grams are dissolved in 180 cc. of acetone and 90 cc. of methanol; 6 grams of β-toluenesulfonic acid in 30 cc. of water are added and the whole is refluxed for 15 minutes. Upon addition of 300 cc. of water, the free 20-methylenepregnenolal crystallizes and, after recrystallization from hexane, melts at 150°–158° C.

c. 3β-hydroxy-21-oxo-23-carbomethoxy-Δ⁵-cholenic acid methyl-ester

16 Grams of 20-methylene-Δ⁵-pregnene-3β-ol-20-al are stirred in 80 cc. of methanol, in which 80 milligrams of Na are dissolved, with 16 cc. of malonic acid dimethyl ester for 1 hour at room temperature and for 1 hour at 0° C. The starting material is thereby dissolved. The Michael addition product separates and is filtered off with suction. Melting point 125°–130° C.

d. 3β-hydroxy-21-oxo-23-carboxy-Δ⁵-cholenic acid

2 Grams of the Michael addition product prepared according to c) are refluxed for 1 hour in 40 cc. of tetrahydrofurane with 140 cc. of 0.5N sodium hydroxide solution and 50 cc. of H₂O. After acidification of the solution by means of dilute hydrochloric acid and concentration under reduced pressure at room temperature, the dicarboxylic acid separates in almost quantitative yield. Melting point 150°–155° C. (decomposition).

e. 3β-hydroxy-21-oxo-Δ⁵-cholenic acid 1.8 Grams of the dicarboxylic acid prepared according to d) are heated in 9 cc. of pyridine under an atmosphere of nitrogen for 2½ hours at 100° C. The major part of the pyridine is then distilled off under reduced pressure and the residue is triturated with 10 cc. of dilute hydrochloric acid. The 3β-hydroxy-21-oxo-Δ⁵-cholenic acid thereby precipitates in crystalline form and, after recrystallization from acetone, melts at 180°–186° C.

f. 3β-acetoxy-21-hydroxy-Δ⁵,²⁰-choladienic acid-21-lactone 7.5 Grams of 3β-hydroxy-21-oxo-Δ⁵-cholenic acid are refluxed for 2 hours with 375 milligrams of sodium acetate in 150 cc. of acetic anhydride, during which time about half the amount of the anhydride is distilled off. The anhydride is then removed by distillation under reduced pressure and the residue is taken up with benzene and chromatographed on 120 grams of silica gel. The benzene eluate is evaporated, and the residue is recrystallized from isopropylether. Melting point 190°–195° C; yield:1.51 grams. The 3β-acetoxy-21-hydroxy-Δ⁵,²⁰-choladienic acid-21-lactone can also be prepared according to the following method:

g. 1 Gram of 3β-hydroxy-21-oxo-Δ⁵-cholenic acid is heated with 50 milligrams of sodium acetate in 20 cc. of acetic acid anhydride for 2 hours, whereby half the amount of the anhydride is removed by distillation. The reaction mixture is then evaporated to dryness (in vacuo) and the residue is heated for 1 hour at 235° C. under a pressure of 150–200 mm. Hg. with 2 grams of sea sand and 0.2 gram of charcoal. After cooling, the enol lactone formed is dissolved in benzene and the solution is filtered through 2 grams of silica gel and evaporated to dryness. On heating with ether the enol lactone crystallizes. 760 milligrams of enol lactone are obtained, melting at 191°–195° C.

h. Δ⁵-(androstene-3β-ol-17β-yl-α-pyrone-acetate. 1 Gram of 3β-acetoxy-21-hydroxy-Δ⁵,²⁰-choladienic acid-21-lactone is heated with 5 grams of a 10 percent palladium/charcoal catalyst at 235° C. in the vacuum of a water aspirator. The temperature is maintained for 60 minutes. After cooling, the α-pyrone formed is extracted and crystallized with ether. Further recrystallization from ether increases the melting point to 198° C. (λmax. 300 mμ).

We claim:

1. 3βhydroxy-21-oxo-23-carbomethoxy-Δ⁵-cholenic acid methyl ester.

2. 3β-hydroxy-21-oxo-23-carboxy-Δ⁵-cholenic acid.

3. 3β-hydroxy-21-oxo-Δ⁵-cholenic acid.

4. The method of making a member selected from the group consisting of a saturated (androst-17β-yl)-α-pyrone of the formula

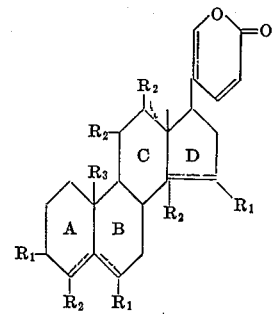

in which the nuclei A, B, C, and D may be linked to each other in the cis- or trans-position, and corresponding unsaturated Δ⁴-, Δ⁵-, and Δ¹⁴- (androst-17β-yl)-α-pyrones, wherein $R_1$, linked to a saturated carbon atom, is selected from the group consisting of oxo, two hydrogen atoms, and one hydrogen atom and one esterified hydroxy group; $R_2$, linked to a saturated carbon atom, is selected from the group consisting of two hydrogen atoms, and one hydrogen atom and one esterified hydroxy group; $R_1$ and $R_2$, linked to an unsaturated carbon atom, are each hydrogen, and $R_3$ is selected from the group consisting of methyl and esterified methylol; which method comprises:

1. reacting a methyltriphenyl-phosphonium halide in a Wittig reaction with a 20-keto-21-acetal pregnene of the formula

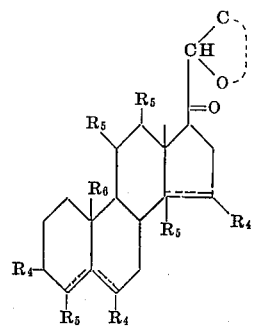

to form the corresponding 20-methylene compound of the formula

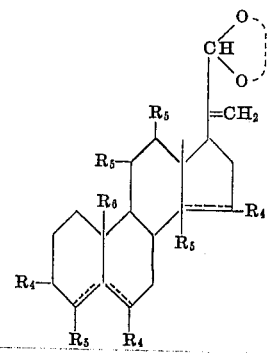

wherein $R_4$, linked to a saturated carbon atom, is selected from the group consisting of enol-ether, enamine, ketal, thioketal, two hydrogen atoms, and one hydrogen atom and one etherified hydroxy group; $R_5$, linked to a saturated carbon atom, is selected from the group consisting of two hydrogen atoms, and one hydrogen atom and one etherified hydroxy group; $R_4$ and $R_5$, linked to an unsaturated carbon atom, are each hydrogen; $R_6$ is selected from the group consisting of methyl and etherified methylol; and

is selected from the group consisting of open and cyclic acetal;

2. hydrolyzing the 21-acetal group of said 20-methylene compound in the presence of an acid to form a 21-aldehyde of the formula

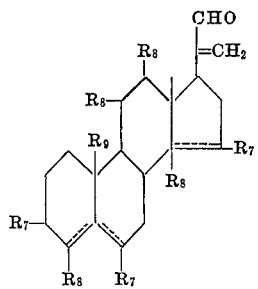

wherein $R_4$, linked to a saturated carbon atom, is selected from the group consisting of oxo, two hydrogen atoms, and one hydrogen atom and one hydroxy group; $R_8$, linked to a saturated carbon atom, is selected from the group consisting of two hydrogen atoms, and one hydrogen atom and one hydroxy group; $R_7$ and $R_8$, linked to an unsaturated carbon atom, are each hydrogen; and $R_9$ is selected from the group consisting of methyl and methylol;

3. adding a malonic ester of the formula $CH_2(COOR)_2$, wherein R is selected from the group consisting of alkyl and aralkyl, to the 20-methylene unsaturation of said 21-aldehyde by a Michael addition reaction in the presence of a base to form a dicarboxylic acid ester of the formula

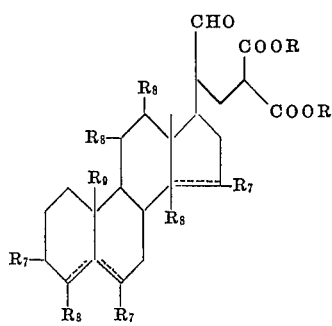

4. hydrolyzing said dicarboxylic acid ester to the corresponding free dicarboxylic acid;

5. heating said free dicarboxylic acid at a temperature of at least about 100° C. to form a corresponding monocarboxylic acid of the formula

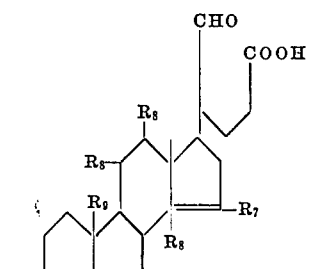

6. heating said monocarboxylic acid together with a carboxylic acid anhydride to form an enol-α-lactone of the formula

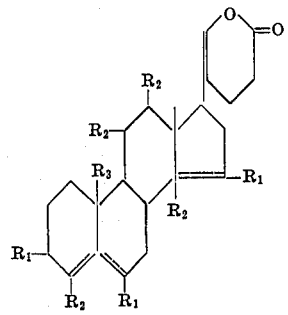

and 7. dehydrogenating said enol-α-lactone in the presence of a dehydrogenating agent to form the corresponding α-pyrone.

5. The method as in claim 4 wherein said carboxylic acid anhydride is selected from the group consisting of acetic acid anhydride, propionic acid anhydride, and benzoic acid anhydride; said esterified hydroxy groups $R_1$ and $R_2$ are selected from the group consisting of acetate, propionate, and benzoate; and said esterified methylol group $R_3$ is selected from the group consisting of methylene acetate, methylene propionate, and methylene benzoate.

6. The method as in claim 5 wherein said etherified hydroxy groups $R_4$ and $R_5$ are tetrahydropyranyl-ether groups; and said etherified methylol group $R_6$ is a methylene-oxytetrahydropyranyl-ether group.

7. The method as in claim 5 wherein said free dicarboxylic acid is heated at a temperature of about 100° C. in a weakly basic solvent to form said monobasic acid.

8. The method as in claim 5 wherein said free dicarboxylic acid is heated at a temperature between 130° C. and 180° C. in the absence of a solvent to form said monobasic acid.

9. The method as in claim 5 wherein said enol-α-lactone is dehydrogenated in the presence of a dehydrogenating agent selected from the group consisting of a quinone, selenium dioxide, and palladium.

* * * * *